United States Patent [19]

Judat et al.

[11] 4,045,190
[45] Aug. 30, 1977

[54] METHOD FOR REGULATING THE FLOW OF LIQUID THROUGH MASS TRANSFER COLUMNS

[75] Inventors: Artur Judat; Helmut Judat, both of Langenfeld; Gerd Grah, Haan, all of Germany

[73] Assignee: Bayer Aktiengesellschaft, Leverkusen, Germany

[21] Appl. No.: 476,830

[22] Filed: June 6, 1974

[30] Foreign Application Priority Data

June 19, 1973  Germany .............................. 2331195

[51] Int. Cl.² ............................................ B01D 47/02
[52] U.S. Cl. ........................................ 55/93; 55/225; 55/227; 261/114 R
[58] Field of Search ................ 55/94, 93, 223, 16, 55/24, 225, 227; 261/114 R

[56] References Cited

U.S. PATENT DOCUMENTS

| 1,725,925 | 8/1929 | Kent .......................................... 55/46 |
| 2,470,438 | 5/1949 | Jackson et al. .......................... 55/94 |
| 3,532,595 | 10/1970 | Arnesjo et al. ...................... 55/94 X |
| 3,716,220 | 2/1973 | Bloomsburg et al. ....... 261/114 R X |

Primary Examiner—Thomas G. Wyse
Assistant Examiner—Robert H. Spitzer
Attorney, Agent, or Firm—Gene Harsh; Joseph C. Gil

[57] ABSTRACT

A method is provided for controlling the flow of liquid through a column separated by vertically spaced plates into compartments to determine the height of liquid on a plate wherein the liquid is flowed through tubes from compartment to compartment and the rate of flow through the tubes is regulated by a throttle valve responsive to gas pressure below a plate or to the height of liquid in a compartment.

7 Claims, 4 Drawing Figures

METHOD FOR REGULATING THE FLOW OF LIQUID THROUGH MASS TRANSFER COLUMNS

This invention relates to a method for regulating the heights of bubble layers in multistage mass transfer columns having gas-distributor plates arranged at intervals one above the other, in which the compartments formed by two vertically adjacent gas-distributor plates communicate with one another by means of tubes.

In conventional multistage mass transfer columns, the bubble layers on the individual trays are largely constant in height. The countercurrent columns are essentially plate columns, in which the overflow baffles known from the distillation art are elevated in order to obtain tall bubble layers and, hence, prolonged liquid residence times. The columns generally used for co-current operation are plate columns which do not have any overflow baffles or run-off ducts so that the liquid and gas have to flow together through the plate openings. Both countercurrent and co-current operations are characterized by the absence of a continuous column of liquid extending over the entire height of the column.

German Patent Specification No. 335,552 describes a multistage mass transfer column with sieve plates in which the individual compartments communicate with one another by means of run-off tubes in such a way that a continuous column of liquid is formed over the entire height of the column. If the gas load is increased, the height of the bubble layer decreases. Conversely, if the gas load is reduced, the height of the bubble layer increases. This contrary behavior has an adverse effect upon the required mass transfer.

An object of the invention is to provide for the adjustment of the height of the bubble layer in each compartment of a mass transfer column independently of the liquid and gas loads selected. The gas and liquid are intended to be able to flow through the mass transfer column concurrently or counter-currently.

Another object of the invention is to provide a method for regulating mass transfer columns known per se with a continuous column of liquid over the entire height of the column in such a way that the bubble layers in each compartment can be adjusted to heights which are unaffected by the liquid and gas loads selected.

Other objects of the invention will become apparent from the following description of an example of the invention with reference to the accompanying drawing, wherein.

The objects of the invention are achieved, generally speaking, by fitting each communicating tube between the compartments with a throttle member which is controlled by the pressure difference between the gas cushions below the gas-distributor plates of two successive compartments.

The particular advantage of the method according to the invention is that, in the event of any increase in load, the bubble layer can be increased in height and accordingly, in the event of reductions in load, the height of the bubble layer can be reduced. This behavior of the mass transfer column is of particular advantage in cases where a certain average residence time has to be maintained in the column for the liquid phase, for example, in cases where the mass transfer column is operated as a chemical reactor.

Figure 1:
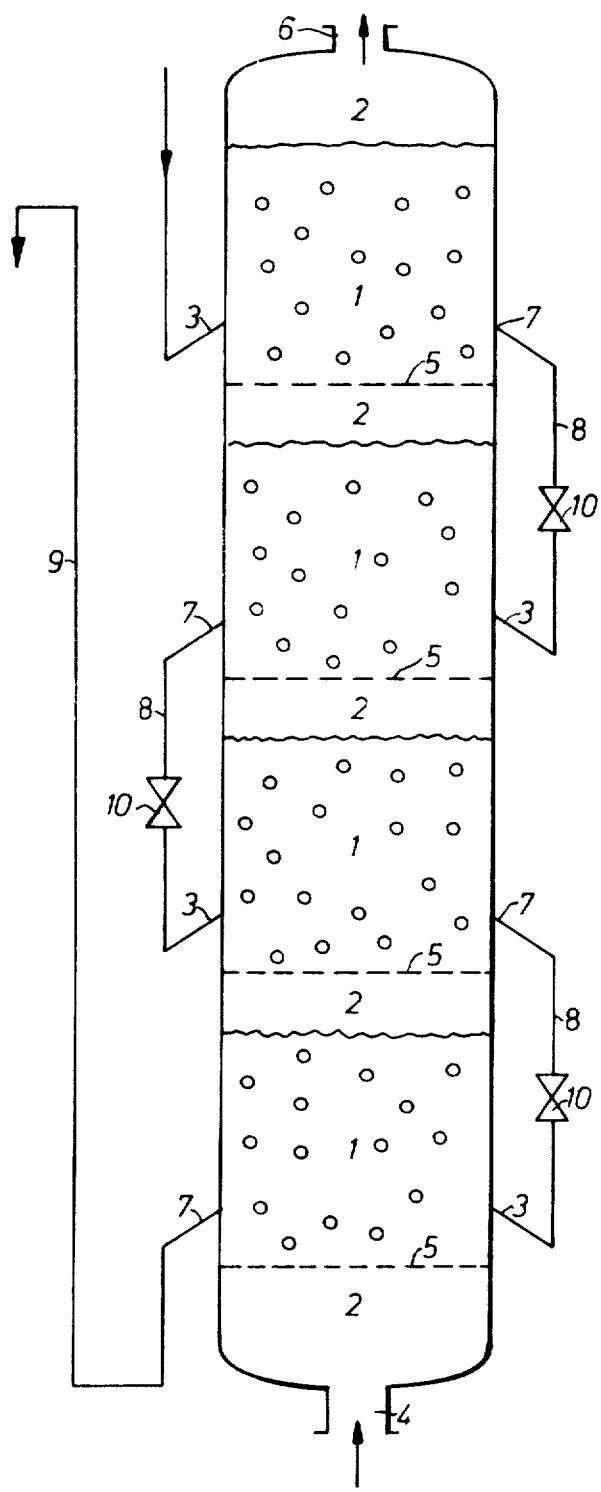
FIG. 1 shows the structure of a mass transfer column for countercurrent operations.

Referring now to FIG. 1, the structure of the mass transfer column with gas and liquid flowing countercurrently to each other is illustrated. The mass transfer column is divided into vertically spaced compartments by several substantially parallel gas-distributor plates 5 arranged one above the other at certain intervals. The gas-distributor plates 5 advantageously occupy the entire cross-section of the column. In the stationary phase, a liquid-bubble layer 1 and a gas layer 2 are present in each compartment. The liquid is delivered to the uppermost compartment through an inlet 3, while the gas is introduced at the lower end of the mass transfer column through an inlet 4.

The gas, which flows upwardly through the column, is dispersed through each distributor plate 5 and enters into intensive mass transfer with the liquid in each bubble layer 1 before collecting in the gas layer 2 below each distributor plate 5. The gas leaves the mass transfer column through the outlet 6.

Plates 5 are impervious to liquid so the liquid, which flows downwardly through the mass transfer column passes through an outlet 7 from each plate and below a communicating tube 8 into the compartment below until the liquid leaves the mass transfer column through the overflow 9. The gas-distributor plates are designed in such a way that the liquid is unable to flow through the plates, so that the liquid passes from one compartment to the next solely by means of the communicating tubes 8 which are each fitted with a throttle unit 10.

Figure 2:
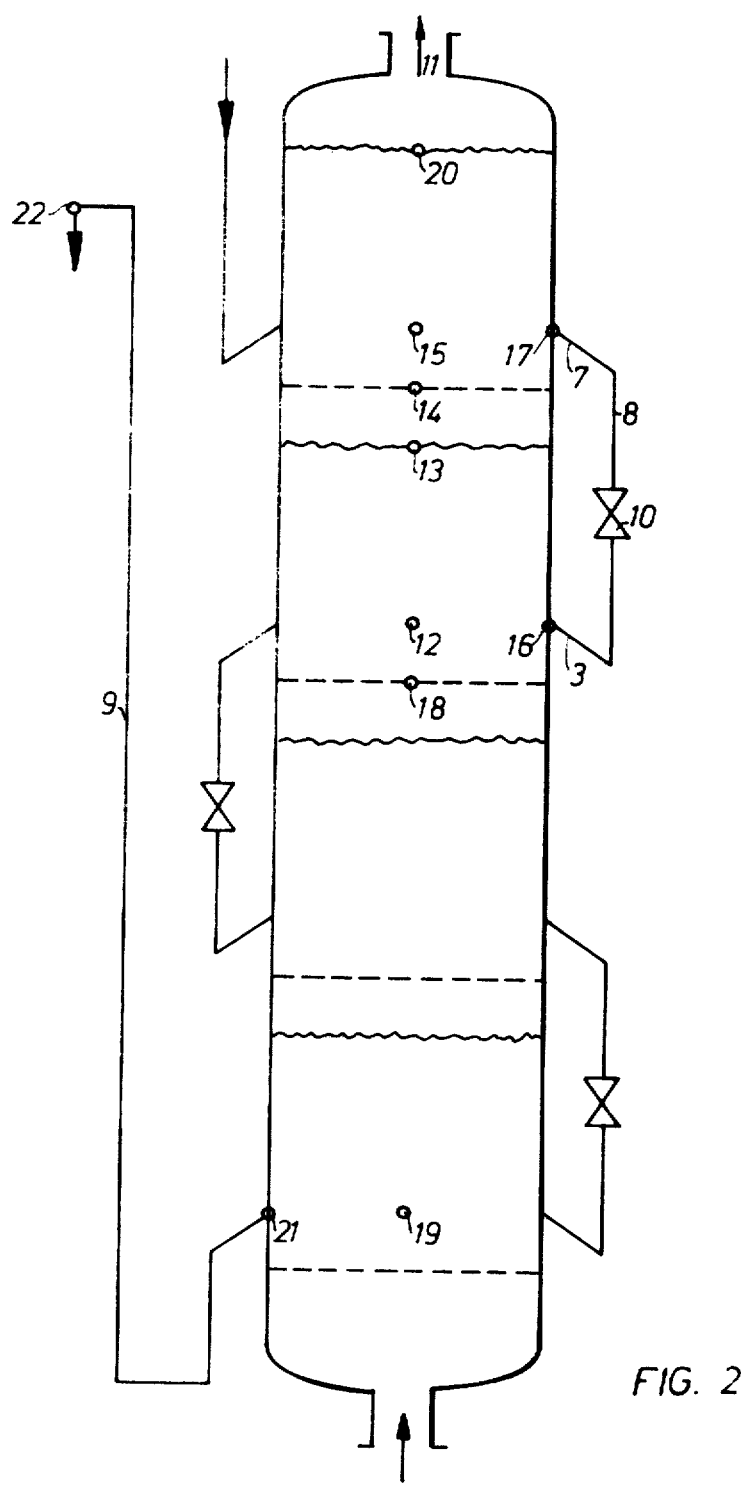
FIG. 2 shows the mass transfer column in counter-current operation for deriving formulae.

The way in which the method according to the invention works in a countercurrent bubble column is illustrated with reference to FIG. 2. In the stationary phase, an equilibrium prevails between the pressure drop along the column axis 11 between points 12 and 15, and the pressure drop in the communicating tube 8 between points 16 and 17, so that:

$$\Delta P_{-12-15} = \Delta P_{-16-8-17} \qquad (1)$$

According to the equation $$\Delta P_{-12-15} = \Delta P_{-SP_{12-13}} + \Delta P_{-BO_{14}} + \Delta P_{SP_{14-15}} \qquad (2)$$

the pressure drop along the column axis $\Delta P_{-12-15}$ is made up of the following constituents:

$\Delta P_{-SP_{12-13}}$ = hydrostatic pressure of the bubble layer 12–13

$\Delta P_{-BO_{14}}$ = pressure loss across the distributor plate (point 14)

$\Delta P_{-SP_{14-15}}$ = hydrostatic pressure of the bubble layer 14–15

The pressure drop in the communicating tube 8 between the points 16 and 17, $\Delta P_{-16-8-17}$, is the hydrostatic pressure of the ungassed liquid $\Delta P_{-FL_{16-8-17}}$, less the pressure loss caused by tube friction $\Delta P_{-RE_{7-8-3}}$ and the pressure loss in the throttle zone $\Delta P_{-DR_{10}}$:

$$\Delta P_{-16-8-17} = \Delta P_{-FL_{16-8-17}} = \Delta P_{-RE_{7-8-3}} = \Delta P_{-DR_{10}} \qquad (3)$$

Accordingly, the pressure equilibrium according to equation 1 is defined as $$\Delta P_{-SP_{12-13}} + \Delta P_{-BO_{14}} + \Delta P_{-SP_{14-15}} = \Delta P_{-FL_{16}} - \Delta P_{-RE_{7-8-3}} - \Delta P_{-DR_{10}} \quad (4)$$

Since the hydrostatic pressure of the bubble layer 18-12 is substantially the same as that of the bubble layer 14-15, $$\Delta P_{-SP} = \Delta P_{-SP_{12-13}} + \Delta P_{-SP_{14-15}} \approx \Delta P_{-SP_{12-13}} + \Delta P_{-SP_{18-12}} \quad (5)$$

wherein $\Delta P_{-SP}$ is the hydrostatic pressure of the entire bubble layer taken into consideration.

With equation 5, therefore, the basic equation for the pressure equilibrium in countercurrent operation of the multistage mass-transfer column according to the invention, is as follows:

$$\Delta P_{-SP} + \Delta P_{-BO} = \Delta P_{-FL} - \Delta P_{-RE} - \Delta P_{-DR} \quad (6)$$

or $$\Delta P_{-BO} = \Delta P_{-FL} - \Delta P_{-SP} - \Delta P_{-RE} - \Delta P_{-DR} \quad (7)$$

In discussing the mode of operation of the column, it is best initially to disregard the pressure loss $\Delta P_{-RE}$ of the flowing liquid in the communicating tubes 8. In addition, it can be negligibly low by adequately dimensioning the diameter of the communicating tubes 8 for all of the liquid loads which occur:

$$\Delta P_{-RE_{7-8-3}} \approx 0 \quad (8)$$

Accordingly, $$\Delta P_{-BO} = \Delta P_{-FL} - \Delta P_{-SP} - \Delta P_{-DR} \quad (9)$$

Equation 9 shows that, in the event of increases in gas load, i.e. in the event of increases in the pressure loss across the gas-distributor plate $\Delta P_{-BO}$, the height of the bubble layer or its hydrostatic pressure $\Delta P_{-SP}$ has to be kept lower for a constant setting of the throttle unit ($\Delta P_{-DR}$ = const.), because the hydrostatic pressure of the ungassed liquid in the communicating tube 4 $\Delta P_{-FL}$ represents a constant for a compartment of given height. However, it is also clear that the height of the bubble layer can be prevented from decreasing by compensating for the increase in pressure loss across the gas-distributor plate by reducing the pressure loss in the throttle zone $\Delta P_{-DR}$. In addition, the height of the bubble layer or its hydrostatic pressure $\Delta P_{-SP}$ can even be increased as required by further reducing the pressure loss in the throttle zone $\Delta P_{-DR}$.

Conversely, in the event of reductions in gas load, i.e. in the event of a reduction in the pressure loss across the gas distributor plate $\Delta P_{-BO}$, the hydrostatic pressure of the bubble layer $\Delta P_{-SP}$, i.e. the height of the bubble layer, can be reduced as required by increasing the pressure loss in the throttle zone $\Delta P_{-DR}$.

Any change in the liquid load is accompanied by a change in the pressure loss in the throttle zone $\Delta P_{-DR}$. Unless the throttle unit is readjusted, equation 9 can only be satisfied by changing the term $\Delta P_{-SP}$, i.e. the height of the bubble layer, which decreases in the event of an increase in liquid load and, conversely, increases in the event of a reduction in the liquid load. This also applies when the pressure loss in the communicating tube $\Delta P_{-RE}$ is taken into consideration. Since this kind of behavior of the mass transfer column is generally undesirable, it is possible, by suitably setting the throttle unit, to increase or reduce the height of the bubble layer, even in the event of increases or reductions in the liquid load, in such a way that the liquid volumes in each compartment correspond to the residence-time requirements.

The height of the overflow 9 follows the pressure equilibrium.

$$\Delta P_{-19-20} + P_{-20} = \Delta P_{-21-22} + P_{-22} \quad (10)$$

in which:

$\Delta P_{-19-20}$ = pressure loss along the column axis 11 between points 19 and 20

$P_{-20}$ = pressure at the head of the column at point 20

$\Delta P_{-21-22}$ = pressure loss in the overflow between points 21 and 22

$P_{-22}$ = pressure at the overflow end at point 22

Equation 10 shows that, in the event of changes in the liquid and/or gas loads, the pressure loss in the overflow $\Delta P_{-21-22}$ has to be adapted to the new situation on the account of the resulting changes in $\Delta P_{-19-20}$ ($P_{-20}$ and $P_{-22}$ being constant).

Figure 3:
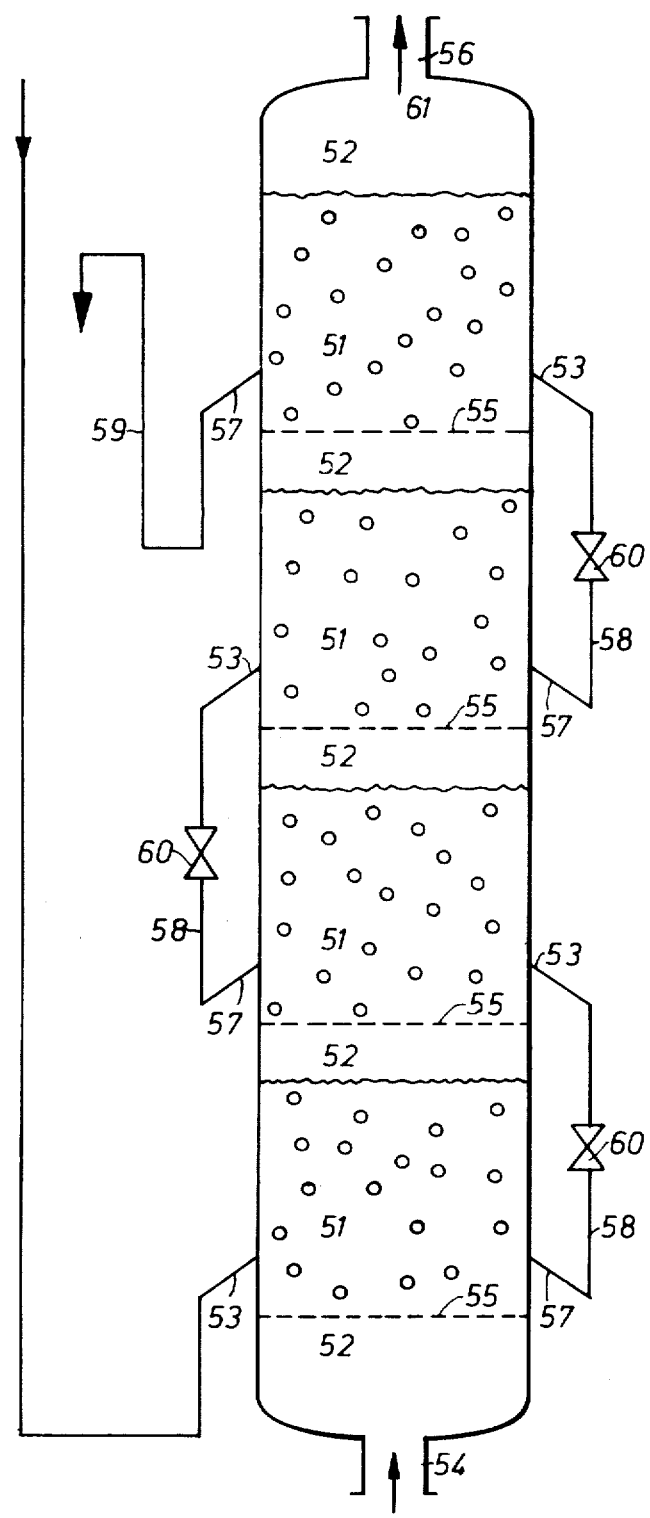
FIG. 3 shows the structure of the mass transfer column for parallel-current operation.
Figure 4:
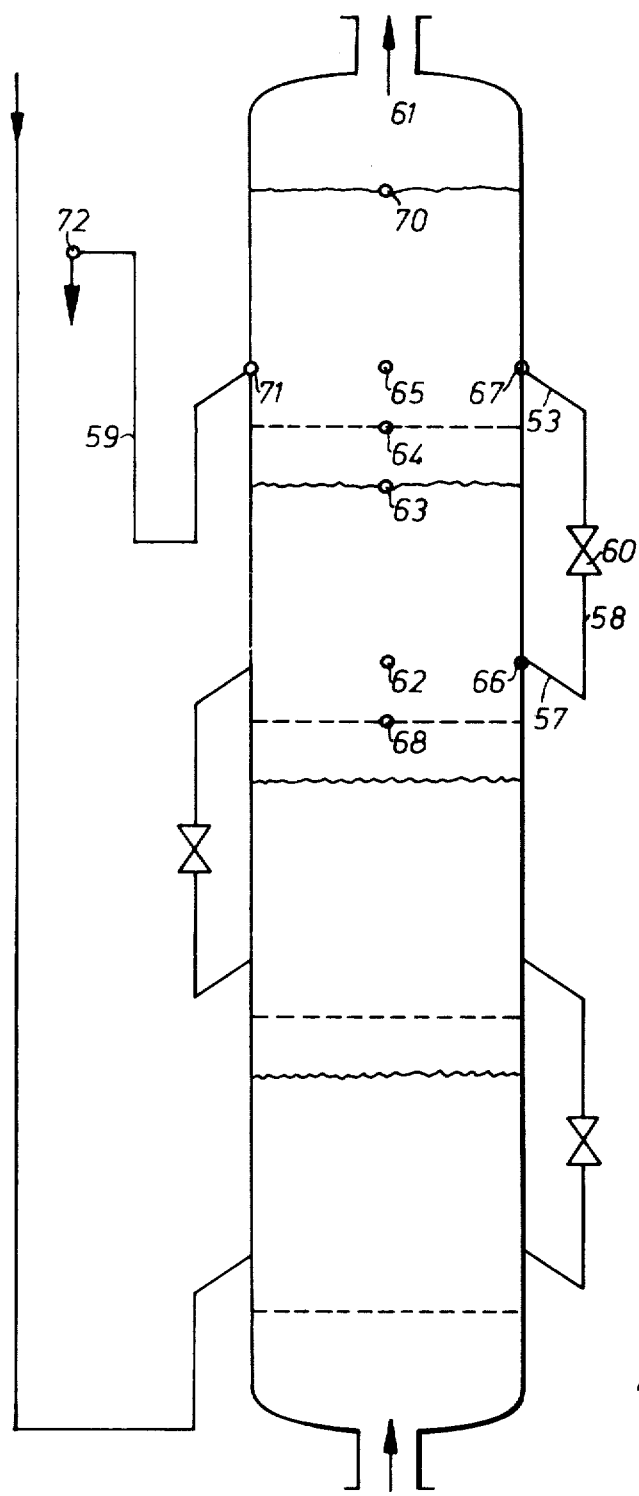
FIG. 4 shows the mass transfer column in concurrent operation for deriving formulae.

The structure and mode of operation of the mass transfer column according to the invention with the gas and liquid flowing concurrently will be described in the following with reference to FIGS. 3 and 4:

The mass transfer column itself is no different in structure, apart from the inlets and outlets for the liquid, from the mass transfer column already described in detail for countercurrent operation. The gas and liquid both flow upwardly through the column, the gas being introduced at the lower end of the column through an inlet 54 while the liquid is introduced into the lowermost compartment of the column through an inlet 53. The liquid, which passes from one compartment to the next through communicating tubes 58, leaves the uppermost compartment of the column through an outlet 57 and an overflow 59. As in countercurrent operation, the gas only flows along the column axis 61 and leaves the uppermost compartment through an outlet 56.

The mode of operation of the mass transfer column according to the invention with gas and liquid flowing in parallel current is described in the following with reference to FIG. 4. In the stationary phase, the equilibrium $$\Delta P_{-BO} = \Delta P_{-FL} - \Delta P_{-SP} + \Delta P_{-RE} + \Delta P_{-DR} \quad (11)$$

or, disregarding $\Delta P_{-RE}$, $$\Delta P_{-BO} = \Delta P_{-FL} - \Delta P_{-SP} + \Delta P_{-DR} \quad (12)$$

prevails between the pressure drop along the column axis 61 between points 62 and 65 and the pressure drop in the communicating tube 58 between points 66 and 67. In contrast to counter-current operation, according to equations 7 and 9, the terms $\Delta P_{-RE}$ and $\Delta P_{-DR}$ receive a positive sign in concurrent operation. Since these terms are only influenced by the liquid load, the column operated concurrently behaves in the same way as the countercurrent column in regard to changes in the height of the bubble layer accompanying changes in gas load. By contrast, it behaves oppositely in the event of changes in liquid load. Accordingly, changes to the throttle unit itself in co-current operation affect the changes in the height of the bubble layer oppositely in relation to concurrent operation.

The overflow height can be determined from the pressure equilibrium equation 13:

$$\Delta P_{-65-70} + P_{-70} = \Delta P_{-71-72} + P_{-72} \qquad (13)$$

in which $\Delta P_{-65-70}$ = pressure loss along the column axis 61 between points 65 and 70

$P_{-70}$ = pressure at the head of the column at point 70

$\Delta P_{-71-72}$ = pressure loss in the overflow between points 71 and 72

$P_{-72}$ = pressure at the overflow end at point 72

Equation 13 shows that, in the case of co-current operation, the overflow height is governed solely by the hydrostatic pressure of the bubble layer (height) in the uppermost compartment of the column where $P_{-70}$ and $P_{-72}$ are constants.

Although the invention has been described in detail for the purpose of illustration, it is to be understood that such detail is solely for that purpose and that variations can be made by those skilled in the art without departing from the spirit and scope of the invention except as it may be limited by the claims.

What is claimed is:

1. A method for regulating the heights of bubble layers in multistage mass-exchange columns with gas-distributor plates arranged at intervals above one another, in which the compartments each formed by two vertically adjacent gas-distributor plates communicate with one another through tubes which comprises throttling the flow of liquid through the tubes in response to the pressure difference between the gas cushions below the gas-distributor plates of two successive compartments.

2. The method of claim 1 wherein the flow rate of liquid through the tube between the compartments is determined by the height of the column of liquid in the compartment.

3. A method for regulating the height of liquid bubble layer on a plate which separates a column adapted for bubbling a gas through a liquid into compartments, said column having a plurality of such plates, spaced longitudinally therein, said plates being impervious to liquid but pervious to a gas, which comprises flowing the liquid from one compartment to the next adjacent compartment through a tube provided with a throttle valve which is responsive to the difference in gas pressure below two adjacent plates.

4. A method for regulating the height of liquid bubble layer on the plate which separates a column adapted for bubbling a gas through a liquid into compartments, said column having a plurality of such plates, spaced longitudinally therein, said plates being impervious to liquid but pervious to gas, which comprises flowing the liquid from one compartment to the next adjacent compartment through a tube provided with a throttle valve which is responsive to the height of the column of liquid in the compartment into which liquid is flowing.

5. An apparatus for bubbling a gas through a liquid comprising a vertically disposed housing enclosing a columnar space, means for introducing a gas into the bottom of the space, means for introducing liquid into the space above the gas introducing means, a plurality of vertically spaced plates which are pervious to gas and impervious to liquid separating the said columnar space into compartments, means for flowing liquid from one compartment to another comprising a throttle valve which is responsive to gas pressure, or to liquid height in a compartment into which liquid flows.

6. The apparatus of claim 5 wherein the valve is responsive to gas pressure in the compartment.

7. The apparatus of claim 5 wherein the valve is responsive to the height of a liquid column in the compartment.

* * * * *